United States Patent [19]

Macdonald et al.

[11] Patent Number: 5,695,155
[45] Date of Patent: Dec. 9, 1997

[54] RESONATOR-BASED, SURFACE-CONDITION SENSOR

[75] Inventors: Perry A. Macdonald, Culver City; Jennifer M. Butler, Pacific Palisades, both of Calif.

[73] Assignee: Hughes Aircraft Company, Los Angeles, Calif.

[21] Appl. No.: 531,876

[22] Filed: Sep. 21, 1995

[51] Int. Cl.$^6$ ............................................. B64D 19/00
[52] U.S. Cl. ............................ 244/134 F; 340/582
[58] Field of Search ................... 244/134 F; 340/580, 340/581, 582, 583, 962; 73/170.26

[56] References Cited

U.S. PATENT DOCUMENTS

| | | |
|---|---|---|
| 2,419,266 | 4/1947 | Kliever et al. ......................... 340/580 |
| 3,134,563 | 5/1964 | Stuetzer ............................. 244/134 F |
| 4,054,255 | 10/1977 | Magenheim ......................... 244/134 F |
| 5,005,015 | 4/1991 | Dehn et al. . |
| 5,474,261 | 12/1995 | Stolarczyk et al. ...................... 340/582 |

*Primary Examiner*—Andres Kashnikow
*Assistant Examiner*—Tien Dinh
*Attorney, Agent, or Firm*—V. D. Duraiswamy; W.K. Denson-Low

[57] ABSTRACT

A sensor is provided for detecting the presence of dielectric media, e.g., ice. The sensor includes a plurality of microstrip resonators which are positioned for electromagnetic coupling with a microstrip transmission line. The resonators produce amplitude minima in a radio-frequency signal that is carried over the transmission line. The resonance of the resonators changes in response to the addition of a dielectric coating. Each resonator can be configured with a different resonant frequency which serves as a signature that identifies the respective resonator's position. The sensor has a thin aerodynamic profile, can conform to nonplanar surfaces and its installation requires no intrusion into an aircraft skin.

24 Claims, 3 Drawing Sheets

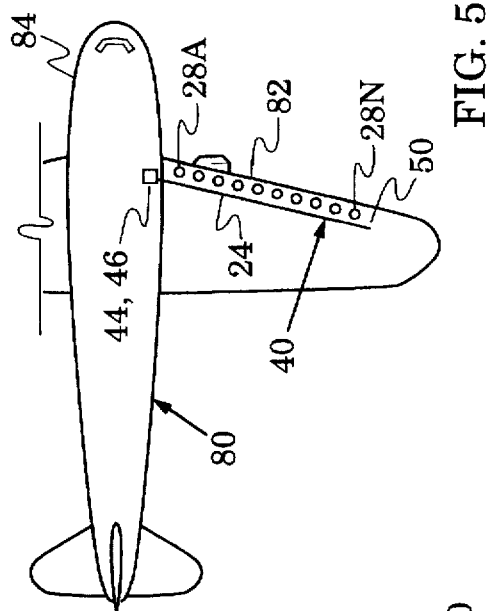
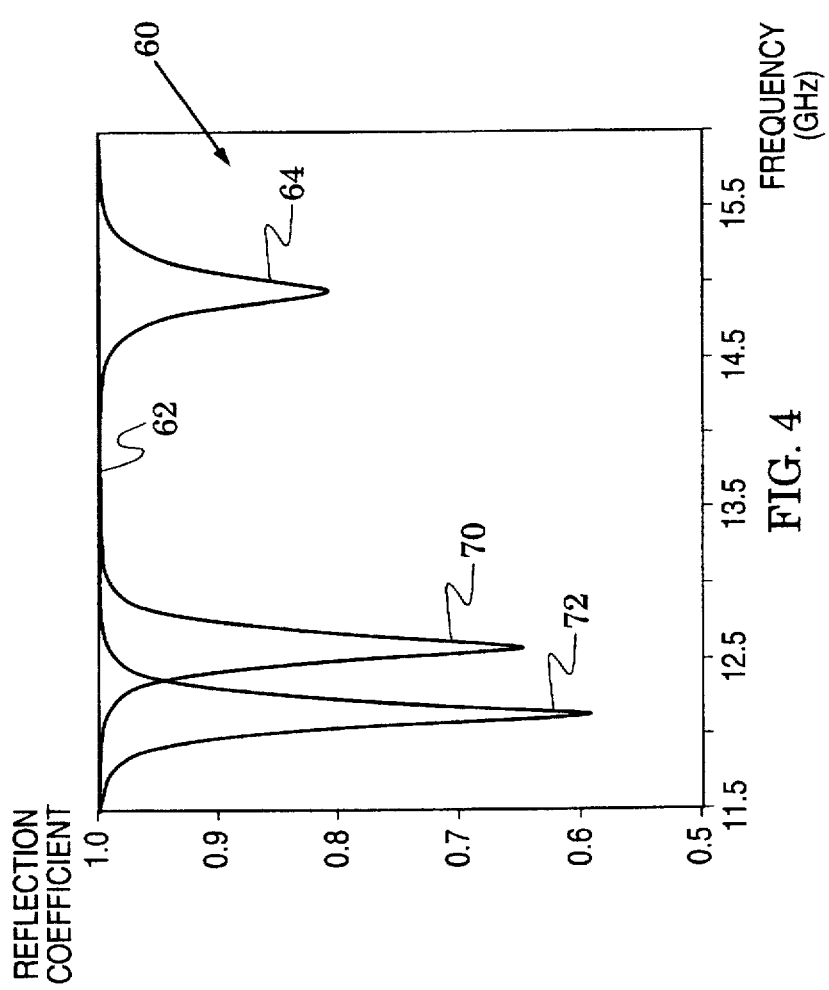

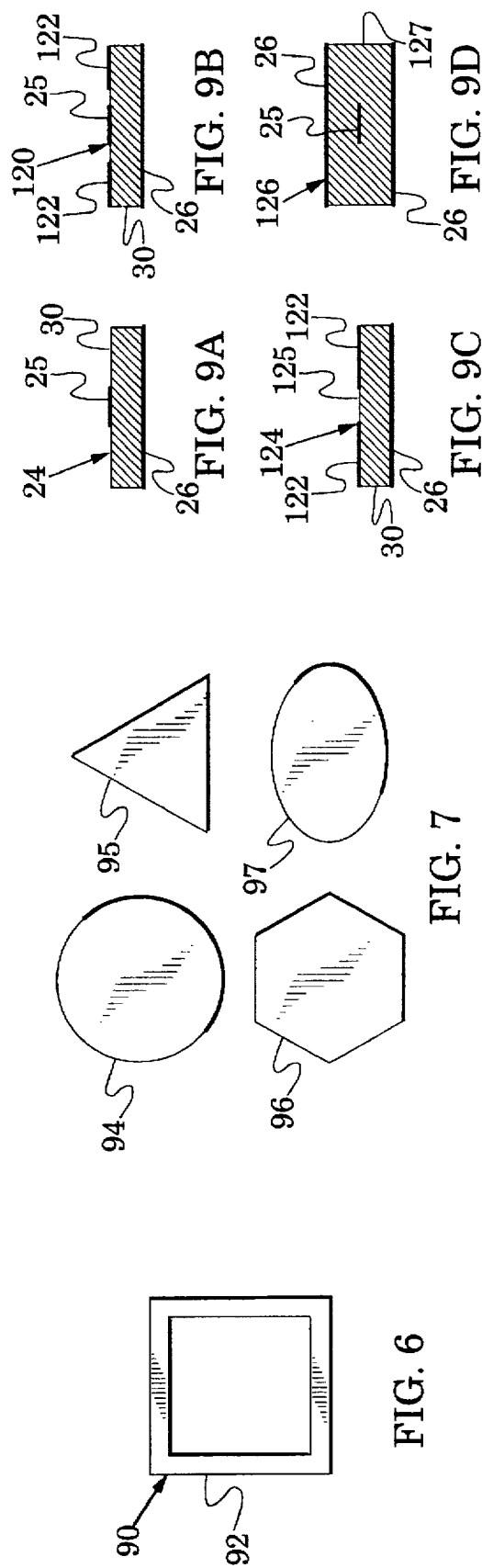
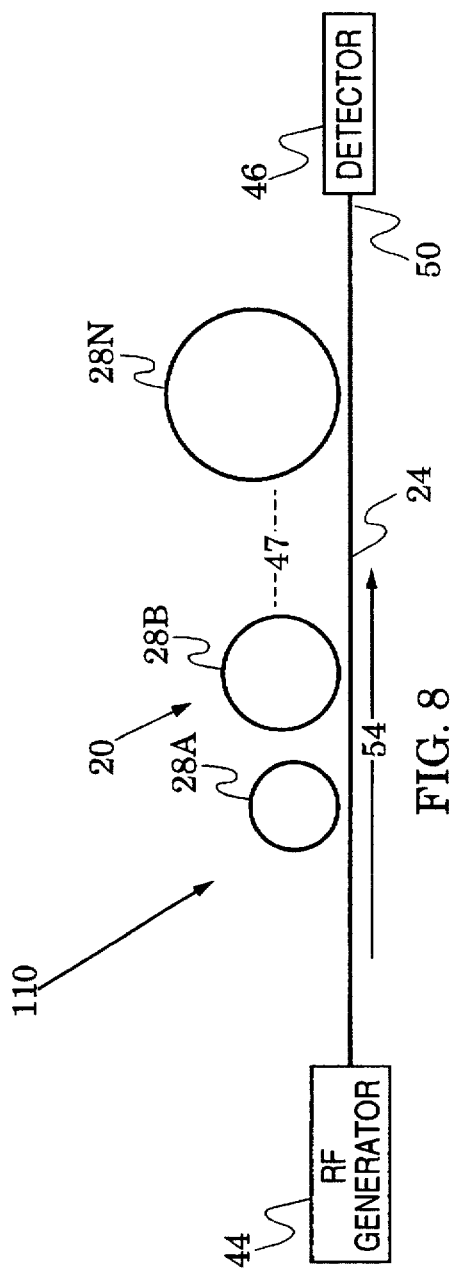

RESONATOR-BASED, SURFACE-CONDITION SENSOR

BACKGROUND OF THE INVENTION

1. Field of the Invention

The present invention relates generally to surface-condition sensors, and more particularly to sensors for the detection of ice.

2. Description of the Related Art

Because of its danger to aircraft safety, ice formation on aerodynamic surfaces is a major concern of air lines, aircraft manufacturers, airports, the Federal Aviation Administration (FAA), city and local governments, and the traveling public. Accordingly, large funds have been directed towards the development of an accurate and practical ice-detection system.

In response, a large number of ice-detection systems have been proposed. They have typically been based upon the use of one or more of a variety of signals (e.g., ultrasound, microwave radiation, infrared radiation and light) and have been directed to the measurement of one or more of a variety of parameters (e.g., capacitance, resistance, and air flow).

U.S. Pat. No. 4,570,881 describes an exemplary system in which a metallic diaphragm is positioned at an aerodynamic aircraft surface. The resonant frequency of the diaphragm is dependent upon its mass and stiffness and any material deposited over the diaphragm, e.g., an ice coat, will cause a frequency shift in that resonance. The diaphragm forms a part of the frequency-determining elements of an oscillator so that shifts in the oscillator's frequency indicate the presence of a coating.

Another exemplary system (Inkpen, Stuart, "Aircraft Ice Sensor", *Report of the FAA International Conference on Airplane Ground Deicing*, FS-92-1, Instrumar Limited, Reston, Va., May 28, 1992) positions a series of exposed electrodes on an aircraft surface to measure spatial variations in the electrical properties of a surface coating.

In yet another exemplary system (Henderson, Thomas D., "Infrared Video Wing Ice Detection Systems for Commercial Aircraft", *Report of the FAA International Conference on Airplane Ground Deicing*, FS-92-1, Airborne CCTV, Reston, Va., May 28, 1992), an infrared camera is directed at heated elements which are installed on an aerodynamic surface. The camera senses the change in infrared radiation which results when an ice coating covers the heated elements. While this system is intended primarily for use in association with ground-based, deicing procedures, it illustrates the use of infrared signals in ice detection.

A practical ice-detection system is preferably simple, easily and economically installed, resistant to the mechanical stresses of aircraft environments (e.g., shock and vibration), resistant to atmospheric elements (e.g., heat, cold, rain and ice) and reliable (e.g., having a low false-alarm rate). A practical system should also have a minimal effect upon the aerodynamics of the surface which is being monitored.

Although many previously-proposed sensors can sense the presence of ice, they typically have lacked one or more of the qualities of a practical ice-detection system. For example, the physical size of resonant diaphragms makes it difficult to integrate them into an aerodynamic surface in the quantity needed to monitor that surface without impacting the structural integrity and aerodynamics of the surface. Because proposed electrodes typically have diameters on the order of 4 centimeters and thicknesses on the order of 1 centimeter, they are also difficult to integrate into aerodynamic surfaces. While an infrared camera system avoids this problem, its performance can be degraded by inclement weather conditions and by the presence of deicing fluids (applied while waiting for takeoff).

SUMMARY OF THE INVENTION

The present invention is directed to a simple, reliable and inexpensive ice-detection sensor for aircraft. The invention is also directed to a sensor which has a low aerodynamic profile and which is resistant to the shock, vibration and weather stresses typically associated with aircraft.

These goals are realized with a sensor that positions a radio-frequency (rf) transmission line and a plurality of rf resonators across an aircraft surface. The resonators are positioned on the surface to electromagnetically couple with the transmission line and each resonator is preferably configured to resonate at a different one of a plurality of resonant frequencies.

The resonators produce detectable differences at their resonant frequencies in an amplitude response of an rf signal when it is transported along the transmission line. The resonators are configured so that their electromagnetic field lines communicate with a dielectric coating on the surface. Accordingly, the resonant frequencies shift in response to the presence of ice and the extent of the frequency shift corresponds to the thickness of the ice.

In a sensor embodiment, the transmission line is a microstrip transmission line and the resonators are microstrip signal lines which are arranged to form a closed path and which are positioned with a portion of that path proximate to the microstrip transmission line.

Sensor systems are formed by combining the sensor with a swept-frequency generator and a detector which are also coupled to the transmission line. These elements are arranged so that the signal from the generator passes the resonators before arriving at the detector.

In a system embodiment, the transmission line has a characteristic impedance, the generator and detector are coupled to a first end of the transmission line and a second end of the transmission line is configured to have an impedance which differs from the characteristic impedance.

In features of the invention, the resonator sensitivity increases as the ice coating decreases, the resonant frequency of each detector forms a signature which indicates the location of that resonator (and, hence, an ice coating detected by that resonator) and the sensors can be formed with a flexible substrate to conform with nonplanar surfaces. Sensor installation involves no intrusion into the aircraft skin and only a single transmission line is needed to access a plurality of resonators.

The novel features of the invention are set forth with particularity in the appended claims. The invention will be best understood from the following description when read in conjunction with the accompanying drawings.

BRIEF DESCRIPTION OF THE DRAWINGS

FIG. 4 is a diagram of reflection coefficients in the sensor system of FIG. 3;

FIG. 5 is a plan view of the sensor system of FIG. 3 installed on an aircraft;

FIG. 6 illustrates another open-form resonator for use in the sensor of FIG. 1;

FIG. 7 illustrates closed-form resonators for use in the sensor of FIG. 1;

FIG. 8 is a schematic of another surface-condition, sensor system which includes the sensor of FIGS. 1 and 2;

FIG. 9A is a sectional view of a transmission line in the sensor of FIGS. 1 and 2;

FIG. 9B is a view similar to FIG. 9A, illustrating another transmission line embodiment;

FIG. 9C is a view similar to FIG. 9A, illustrating another transmission line embodiment; and FIG. 9D is a view similar to FIG. 9A, illustrating another transmission line embodiment.

DESCRIPTION OF THE PREFERRED EMBODIMENTS

Figure 2:
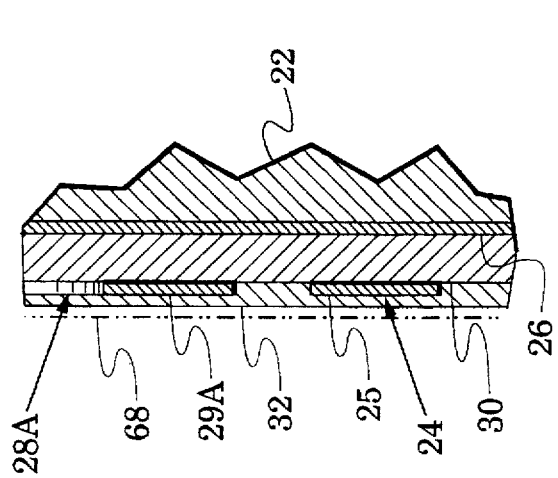
FIG. 2 is an enlarged, sectional view along the plane 2—2 of FIG. 1.
Figure 1:
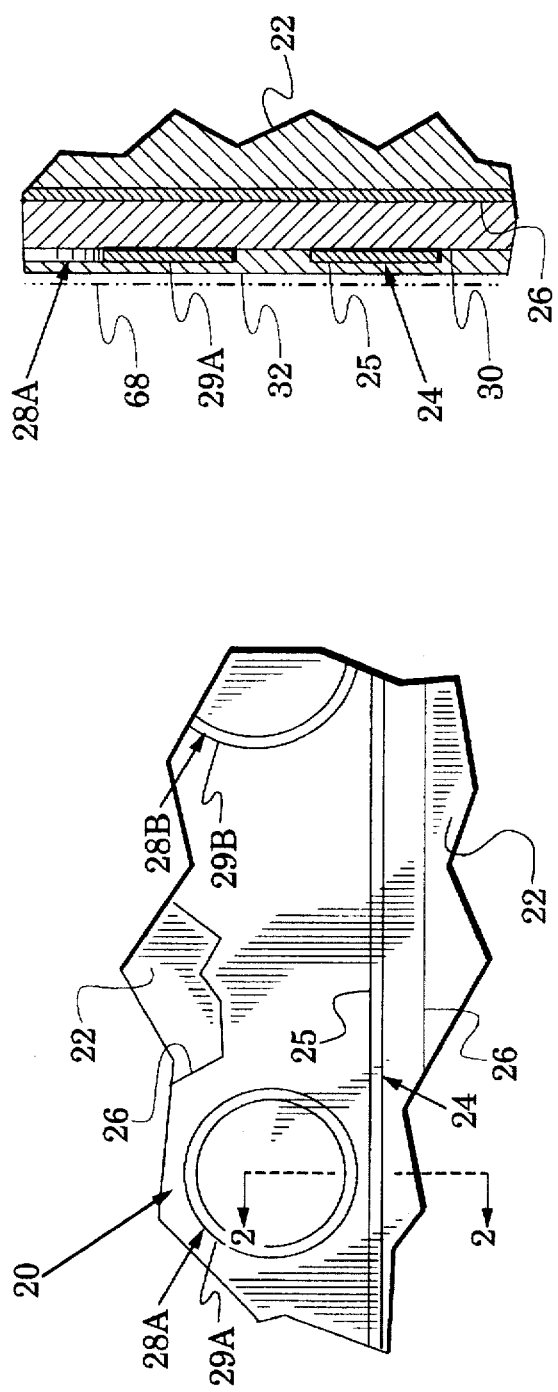
FIG. 1 is a plan view of a resonator-based, surface-condition sensor installed on an aircraft wing.

FIGS. 1 and 2 illustrate a resonator-based sensor 20 installed over the skin 22 of an aerodynamic surface, e.g., an aircraft wing. The sensor 20 includes a microstrip transmission line 24 formed by a microstrip signal line 25 which is spaced above a microstrip ground plane 26. The sensor 20 also includes a plurality N of rf resonators which are represented by resonators 28A and 28B. The resonators 28A and 28B are formed by microstrip signal lines 29A and 29B which are configured in closed paths above the ground plane 26. In the sensor 20, the closed paths are arranged in the form of circles.

The signal line 25 and the signal lines 29A and 29B are spaced from the ground plane 26 by a substrate 30 and the sensor 20 is environmentally protected by a superstrate 32 which covers the signal lines 25, 29A and 29B and the substrate 30.

Figure 3:
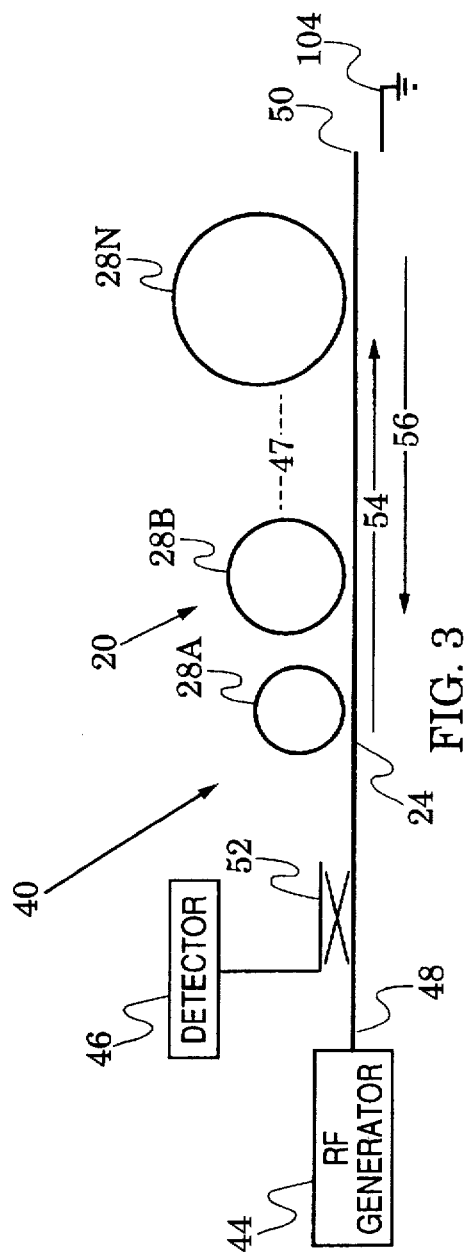
FIG. 3 is a schematic of a surface-condition, sensor system which includes the sensor of FIGS. 1 and 2.

FIG. 3 is a schematic of a sensor system 40 which includes the sensor 20, a frequency-swept, rf generator 44 and an rf detector 46. In the system 40, the sensor 20 has N resonators as indicated by the resonators 28A, 28B, 28N and the broken line 47 which indicates other resonators between resonators 28B and 28N. The transmission line 24 has a first end 48 which is coupled to the generator 44 and a second end 50 which is arranged as an open circuit, i.e., there is no connection between the signal line 25 and the ground plane 26 at the end 50 (the alternate termination 104 is described below). The rf detector 46 is coupled to the transmission line 24 with a directional coupler 52.

In operation of the system 40, an incident, frequency-swept, rf signal 54 is launched down the transmission line 24 by the rf generator 44. The signal 54 passes the resonators 28A–28N and is reflected by the open circuit of the line end 50. This reflection generates a return rf signal 56 which travels past the resonators 28A–28N and is routed to the detector 46 by the directional coupler 52.

For frequencies other than the resonant frequencies of the resonators 28A–28N, the magnitude of the reflection coefficient (ratio of the reflected electric-field vector to the incident electric-field vector) at the detector 46 is substantially 1.0 because of the large mismatch between the characteristic impedance, e.g., 50 ohms, of the transmission line 24 and the open circuit at the end 50.

This is evident in the graph 60 of FIG. 4 which illustrates the results of a computer simulation of a sensor system in which the resonator 28A is configured to resonate initially at −14.9 GHz. In the region of 13.5 GHz to 14.0 GHz the reflection coefficient is substantially 1.0 as shown by the region 62 of the graphed reflection coefficient. In contrast, the magnitude of the reflected electric-field vector will be reduced at the resonant frequency of the resonator by signal coupling between the transmission line 24 and the resonator. This is also evident in the graph 60 in which a pronounced minimum 64 occurs at −14.9 GHz. This is the resonant frequency of the resonator 28A with an air dielectric over the superstrate 32 of FIG. 2.

When a one millimeter layer 68 of ice (the layer 68 is indicated by a broken line in FIG. 2) is added to the superstrate 32, the pattern of the electromagnetic field lines between the signal line 29A and the ground plane 26 is altered because the permittivity of ice differs from that of air. The resonator 28A initially operates with an effective permittivity $\epsilon_{eff}$ which is associated with the permittivity of air and the substrate 30 because the electromagnetic field lines of the resonator flow across both of these media. As the ice layer 68 develops on the superstrate 32, its permittivity also contributes to the effective permittivity $\epsilon_{eff}$. Accordingly, the resonant frequency of the resonator 28A is shifted downward. As a consequence, the graph 60 shows a minimum 70 in the reflection coefficient at −12.6 GHz. The minimum 70 has a lower reflection coefficient than that of the minimum 64 which indicates that the alteration of the effective permittivity $\epsilon_{eff}$ has also increased the Q (quality factor) of the resonator 28A.

As the thickness of the ice layer 68 is increased, the pattern of the electromagnetic field lines between the signal line 29A and the ground plane 26 is further altered and the resonant frequency of the resonator 28A is shifted further downward. However, the effect on the resonant frequency of the resonator 28A lessens as the thickness of the layer 68 increases because a large portion of the electromagnetic field lines tend to be concentrated close to the signal line 29A. A five millimeter layer of ice results in the minimum 72 at −11.6 GHz in FIG. 4.

The computer simulation of FIG. 4 illustrates that the sensitivity of the sensor 20 is at a maximum for thin layers of ice and decreases with increasing ice thickness. This feature of the invention makes it particularly useful for early detection of ice formation on aerodynamic surfaces. Obviously, early detection of ice formation is important when an aircraft is in flight but it is also important when an aircraft is waiting for permission to take off and is setting in ice-formation conditions on a runway.

Because reflection coefficient is an indication of the magnitude of the return signal 56, the graph 60 of FIG. 4 essentially illustrates the amplitude response (relative power level) of sensors of the invention. In practice, each of the resonators 28A–28N of the sensor system 40 is configured with a different resonant frequency which will produce a detectable difference in the amplitude response of a swept-frequency signal. This is indicated in the schematic of FIG. 3 by the increasing diameter of the resonators 28A–28N. Each of these resonators will produce a response similar to that shown in the graph 60 but at a frequency set by their respective resonance. In accordance with another feature of the invention, the resonant frequency of each of the resonators 28A–28N forms a signature which corresponds with the location of its respective resonator.

The FIG. 5 illustrates a typical application of the sensor system 40 of FIG. 3 in an aircraft 80. In this figure, the generator 44 and detector 46 are mounted within the fuselage 82 of the aircraft. They are coupled to the microstrip transmission line 24 which is positioned across the leading edge of a wing 84 of the aircraft 80 with the open-circuited end 50 of the line positioned adjacent to the outer end of the wing. Spaced along the transmission line 24 are the resonators 28A–28N. In this application, the sensor system 40 can sense ice formation along the leading edge of the wing 84. Because each of the resonators 28A–28N is configured with a different one of a plurality of resonant frequencies, the system 40 can also indicate the distance of a particular ice-formation site from the fuselage 94.

As indicated by the graph 60 of FIG. 4, the resonance of microstrip resonators is greatly influenced by the dielectric media associated with the resonators. Although exact analysis of the closed-path resonators 28A–28N is complicated, the initial resonance frequency of each resonator (in the absence of ice) occurs when the path length of its signal line is substantially $n\lambda_g$ in which n is an integer and $\lambda_g$ is wavelength in the microstrip structure. For example, the resonator 28A of FIGS. 1 and 2 will resonate at a frequency for which the path length of the signal line 29A (the circumference of the resonator 28A) is substantially equal to $\lambda_g$.

The resonator 28A of FIGS. 1 and 2 is one embodiment of open-form resonators that are formed with closed-path signal lines. The teachings of the invention may be practiced with other embodiments of open-form resonators. For example, FIG. 6 illustrates a resonator 90 formed with a signal line 92. In this resonator, the signal line is configured in a closed path which is arranged to form a regular polygon. In particular, it is arranged to form a square. Irregular polygon shapes may also be used.

The resonators 28A of FIG. 1 and 80 of FIG. 6 are particularly useful in sensor systems of the invention because their open-form structure enhances communication between their electromagnetic field lines and a dielectric coating. However, the teachings of the invention may be extended to the use of closed-form microstrip resonators. For example, FIG. 7 illustrates a disk resonator 94, a triangular resonator 95, a hexagon resonator 96 and an elliptical resonator 97 which can be used in other sensor system embodiments. Closed-form resonators are also conventionally referred to as patch resonators.

The microstrip substrate 30 of FIGS. 1 and 2 preferably has a low loss tangent and a high dielectric strength. The microstrip wavelength $\lambda_g$ is sensitive to the dielectric constant of the substrate 30. Accordingly, the diameter of the resonators 28A–28N of FIG. 3 can be increased by selecting a substrate with a low dielectric constant. This feature can be advantageously used in the invention because a larger resonator will sense the presence of ice over a larger region of an aerodynamic surface. Although a variety of substrate materials are available for microstrip structures (e.g., alumina, sapphire, glass, ceramic-reinforced Teflon), the selection of a flexible polymer (e.g., reinforced plastic) can be advantageous because it allows the sensors of the invention to conform to nonplanar, aerodynamic surfaces. Such a sensor could be wrapped, for example, around the leading edge of a wing.

The superstrate 32 of FIG. 2 is primarily intended to protect the sensor 20 from weather and abrasion effects without adversely affecting its performance. Accordingly, it should be formed from a material which has good weather and abrasion resistance and a low loss tangent. Many conventional polymers can be used as the superstrate.

The sensor system 40 is particularly suited for installation into an aircraft as shown in FIG. 5 because it positions the generator 44 and detector 46 within the fuselage 82. The termination at the end 50 of the transmission line 24 may be any termination that causes a return signal 56 in response to the incident signal 54 from the generator 44, i.e., any impedance other than the characteristic impedance of the transmission line 24. For example, an alternative configuration of the end 50 of the transmission line 24 is shown in FIG. 3 in the form of a short circuit 104. In this embodiment, the signal line end 50 is connected to the ground plane 26.

Other embodiments of the sensor system 40 are easily configured. For example, FIG. 8 illustrates another sensor system 110 which is similar to the system 40 with like elements indicated by like reference numbers. However, in the system 110 the rf detector 46 is positioned at the end 50 of the transmission line 24 to receive the swept-frequency signal 54 from the rf generator 44. In the system 110, the detector 46 responds to amplitude minimums in the signal 54 which result from the coupling between the resonators 28A–28N and the transmission line 24. This system embodiment may be useful where a sensor is configured in a closed path so that the rf generator 44 and the detector 46 can be housed together. In general, sensor systems in accordance with the invention can be practiced with a generator, a detector and one or more resonators which are all coupled to a transmission line and arranged so that the signal from the generator passes the resonators before arriving at the detector.

In the sensor 20 of FIGS. 1 and 2, the microstrip circuitry of the resonators 28A–28N and the transmission line 24 includes a ground plane 26 which would typically be of a low-resistance material, e.g., copper. Although the ground plane 26 reduces losses in the sensor 20, other embodiments of the invention may be formed by replacing the ground plane 26 with the conductive, aerodynamic skin 22 of the aircraft. In these embodiments the skin 22, which is typically aluminum, becomes the ground plane of the sensor.

The open structure of the microstrip sensor 20 of FIGS. 1 and 2 causes it to be particularly sensitive to the presence of an ice coating. However, the teachings of the invention can be practiced with other transmission line and resonator structures. These structures can be compared to FIG. 9A which is a reduced, sectional view of the microstrip transmission line 24 of FIG. 2. In contrast, FIG. 9B illustrates a coplanar transmission line 120 which adds ground planes 122 on each side of the signal line 25. The ground planes 122 are coplanar with the signal line 25.

FIG. 9C illustrates a slot line transmission line 124 which is similar to the coplanar transmission line 120 but the signal line 25 is replaced by a slot 125 between the ground planes 122. The rf signals (54 and 56 in FIG. 3) are carried between the ground planes 122. Finally, FIG. 9D illustrates a stripline transmission line 126 which is similar to the microstrip transmission line 24 but has the signal line 25 positioned between a pair of ground planes 26. The ground planes 26 are spaced by a wider substrate 127.

Sensors of the present invention are extremely sensitive to thin layers of ice, they have a low aerodynamic profile, they can conform to nonplanar aerodynamic surfaces and they have frequency signatures that identify their location. Because of their thin structure, a large number of sensors can be positioned across critical surfaces, e.g., leading edges of wings, flaps and engine apertures, without impacting the structural integrity or aerodynamic performance of those surfaces. The sensors are simple and easily installed. For example, sensor installation involves no intrusion into the aircraft skin and only a single transmission line is needed to access a plurality of resonators. The sensors can be secured with conventional adhesives and are resistant to shock, vibration and weather.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A sensor for use with a swept-frequency signal in identifying the presence and thickness of a dielectric media on a surface, said sensor comprising:

an elongate transmission line positioned across said surface; and at least one resonator configured to have a resonant frequency, positioned on said surface and separated from said transmission line by a space to electromagnetically couple said resonator with said transmission line;

said resonator producing a detectable difference at said resonant frequency in an amplitude response of said swept-frequency signal when said swept-frequency signal is transported along said transmission line; and said resonant frequency having a frequency shift in response to the presence of said dielectric media on said resonator with the extent of said frequency shift corresponding to said dielectric media thickness.

2. The sensor of claim 1, wherein said at least one resonator includes a plurality of resonators arranged along said transmission line with each resonator configured to have a different one of a plurality of resonant frequencies.

3. The sensor of claim 1, wherein said transmission line is a microstrip transmission line and said resonator includes a microstrip signal line arranged to form a closed path.

4. The sensor of claim 3, wherein said closed path is arranged in the form of a circle.

5. The sensor of claim 3, wherein said closed path is arranged in the form of a polygon.

6. The sensor of claim 3, wherein said closed path has a length substantially equal to $n\lambda_g$ wherein n is a positive integer and $\lambda_g$ is a wavelength of said resonant frequency in said microstrip signal line.

7. The sensor of claim 1, wherein said transmission line is a microstrip transmission line and said resonator is a microstrip patch resonator.

8. A sensor system for identifying the presence and thickness of a dielectric media on a surface, comprising:

an elongate transmission line positioned across said surface;

at least one resonator configured to have a resonant frequency, positioned on said surface and separated from said transmission line by a space to electromagnetically couple said resonator with said transmission line;

a generator configured to generate a swept-frequency signal, said generator coupled to said transmission line; and a detector coupled to said transmission line for detecting an amplitude response of said signal;

wherein said generator, said resonator and said detector are positioned so that said signal couples to said resonator prior to its detection by said detector;

said resonator producing a detectable difference at said resonant frequency in said amplitude response; and said resonant frequency having a frequency shift in response to the presence of said dielectric media on said resonator with the extent of said frequency shift corresponding to said dielectric media thickness.

9. The system of claim 8, wherein:

said transmission line has a characteristic impedance and first and second ends;

said generator and said detector are coupled to said first end; and said second end is configured to have an impedance which differs from said characteristic impedance.

10. The system of claim 8, wherein:

said transmission line has first and second ends;

said generator is coupled to said first end; and said detector is coupled to said second end.

11. The system of claim 8, wherein said at least one resonator includes a plurality of resonators arranged along said transmission line with each resonator configured to have a different one of a plurality of resonant frequencies.

12. The system of claim 8, wherein said transmission line is a microstrip transmission line and said resonator includes a microstrip signal line arranged to form a closed path.

13. The system of claim 12, wherein said closed path is arranged in the form of a circle.

14. The system of claim 12, wherein said closed path is arranged in the form of a polygon.

15. The system of claim 12, wherein said closed path has a length substantially equal to $n\lambda_g$ wherein n is a positive integer and $\lambda_g$ is a wavelength of said resonant frequency in said microstrip signal line.

16. The system of claim 8, wherein said transmission line is a microstrip transmission line and said resonator is a microstrip patch resonator.

17. An aircraft equipped with a sensor system for identifying the presence and thickness of ice, comprising:

an aircraft having an aerodynamic surface;

an elongate transmission line positioned across said surface;

at least one resonator configured to have a resonant frequency, positioned on said surface and separated from said transmission line by a space to electromagnetically couple said resonator with said transmission line;

a generator configured to generate a swept-frequency signal, said generator coupled to said transmission line; and a detector coupled to said transmission line for detecting an amplitude response of said signal;

wherein said generator, said resonator and said detector are positioned so that said signal couples to said resonator prior to its detection by said detector;

said resonator producing a detectable difference at said resonant frequency in said amplitude response; and said resonant frequency having a frequency shift in response to the presence of said dielectric media on said resonator with the extent of said frequency shift corresponding to said dielectric media thickness.

18. The aircraft and sensor system of claim 17, wherein:

said transmission line has a characteristic impedance and first and second ends;

said generator and said detector are coupled to said first end; and said second end is configured to have an impedance which differs from said characteristic impedance.

19. The aircraft and sensor system of claim 17, wherein said at least one resonator includes a plurality of resonators arranged along said transmission line with each resonator configured to have a different one of a plurality of resonant frequencies.

20. The aircraft and sensor system of claim 17, wherein said transmission line is a microstrip transmission line and said resonator includes a microstrip signal line arranged to form a closed path.

21. A sensor for use with a swept-frequency signal in identifying the presence and thickness of a dielectric media on a surface, said sensor comprising:

a plurality of electromagnetic resonators arranged over said surface and each configured to have a respective resonant frequency; and an elongate transmission line arranged across said surface so as to be separated from each of said resonators by a space which electromagnetically couples that resonator to said transmission line;

the magnitude of said swept-frequency signal across said transmission line being reduced at the resonant frequency of each of said electromagnetic resonators by electromagnetic coupling between that resonator and said transmission line and the resonant frequency shifting in response to the presence and thickness of said dielectric media on said surface.

22. The sensor of claim 21, wherein each of said resonators is configured to have a different resonant frequency.

23. The sensor of claim 21, wherein said transmission line is a microstrip transmission line and each of said resonators includes a microstrip signal line arranged to form a closed path.

24. The system of claim 21, wherein said transmission line has a characteristic impedance and one end of said transmission line is configured to have an impedance which differs from said characteristic impedance.

* * * * *